US010830581B1

(12) United States Patent
Zhang et al.

(10) Patent No.: US 10,830,581 B1
(45) Date of Patent: Nov. 10, 2020

(54) SURFACE SMOOTHNESS ANALYSIS (71) Applicant: International Business Machines Corporation, Armonk, NY (US)

(72) Inventors: Dan Zhang, Beijing (CN); Jing Wu, Xian (CN); Fan Li, Xianyang (CN); Xue Ping Liu, Beijing (CN); Yun Jing Zhao, Beijing (CN); Hong Bing Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/677,719

(22) Filed: Nov. 8, 2019

(51) Int. Cl.
*G01N 21/88* (2006.01)
*G01B 11/30* (2006.01)
*G06T 7/10* (2017.01)

(52) U.S. Cl.
CPC .............. *G01B 11/30* (2013.01); *G06T 7/10* (2017.01)

(58) Field of Classification Search
CPC ..... G01B 11/30; G01B 11/303; G01B 11/306; G06T 7/0004; G06T 7/48; G06T 7/194; G06T 7/136; G01N 21/00
USPC ................. 356/600, 237.1–237.5, 445–448; 382/108; 348/128
See application file for complete search history.

(56) References Cited

U.S. PATENT DOCUMENTS

| 6,516,528 B1* | 2/2003 | Choo | G01B 5/28 |
| | | | 33/552 |
| 7,542,589 B2* | 6/2009 | Katayama | G06K 9/6204 |
| | | | 382/104 |
| 2005/0152581 A1* | 7/2005 | Hoki | G06K 9/4604 |
| | | | 382/104 |
| 2013/0322768 A1* | 12/2013 | He | G06T 7/181 |
| | | | 382/199 |
| 2016/0364852 A1 | 12/2016 | Omodt et al. | |

(Continued)

FOREIGN PATENT DOCUMENTS

| CN | 101276151 A | 10/2008 |
| CN | 105378427 A | 3/2016 |

(Continued)

OTHER PUBLICATIONS

Sandak et al., "Evaluation of surface smoothness using a light-sectioning shadow scanner", J Wood Sci (2005), © The Japan Wood Research Society 2005, Received: Feb. 16, 2004 / Accepted: Apr. 16, 2004, 4 pages. https://link.springer.com/content/pdf/10.1007/s10086-004-0637-z.pdf.

(Continued)

*Primary Examiner* — Hoa Q Pham
(74) *Attorney, Agent, or Firm* — Jeffrey M. Ingalls (57) ABSTRACT

A method of determining a smoothness of a surface of an object is provided. The method includes processing an image of the object to obtain opposed first and second boundary lines of a first area of the image where light from a light source is reflected off the surface of the object. The method also includes resizing the image to normalize an average distance between the first and second boundary lines. The method includes processing the resized image to obtain resized first and second boundary lines. The method also includes calculating a variance from linearity for at least one of the resized first and second boundary lines to determine a smoothness value of the surface of the object.

20 Claims, 6 Drawing Sheets

(56) References Cited

U.S. PATENT DOCUMENTS

2018/0286059 A1 10/2018 Matham et al.
2020/0191723 A1* 6/2020 Kuri ........................ G01N 21/55

FOREIGN PATENT DOCUMENTS

CN 109282759 A 1/2019
WO 1993012615 A1 6/1993

OTHER PUBLICATIONS

Rao et al., "Analysis and Assessment of Surface Image Texture Mechanisms", Journal of Global Research in Computer Science, vol. 3, No. 9, Sep. 2012, 6 pages. https://pdfs.semanticscholar.org/5e5f/99b9b19de025022827a23bee7045c5522cf4.pdf.

* cited by examiner

SURFACE SMOOTHNESS ANALYSIS

BACKGROUND

Surface finish is important in manufacturing, especially for high-quality products. For example, in the automobile industry, there is a description known as the "orange peel effect" during refinishing, and this refers to a rough surface appearance. It can be difficult to distinguish an amount of surface roughness with the human eyes. One way of determining surface roughness is to have a person judge the roughness according to a manual visual inspection of the light reflection pattern on the surface. This method is generally not very accurate. Another way of determining surface roughness is to rely on expensive optical instruments.

SUMMARY

Embodiments of the present disclosure relate to a method of determining a smoothness of a surface of an object. A method of determining a smoothness of a surface of an object is provided. The method includes processing an image of the object to obtain opposed first and second boundary lines of a first area of the image where light from a light source is reflected off the surface of the object. The method also includes resizing the image to normalize an average distance between the first and second boundary lines. The method includes processing the resized image to obtain resized first and second boundary lines. The method also includes calculating a variance from linearity for at least one of the resized first and second boundary lines to determine a smoothness value of the surface of the object.

Other embodiments of the present disclosure are directed to a system, apparatus or device for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

The present disclosure describes systems, devices, apparatuses and methods for assessing a smoothness of the surface of an object. The present embodiments consider several factors that can affect the accuracy of a surface smoothness determination, such as whether a metal plate is flat or not, or the location of the camera, etc. In order to exclude external influencing factors, the embodiments of the present disclosure provide standardization image processing techniques with normalization, in which image binarization and resizing is utilized. The present embodiments also provide mechanisms to calculate a smoothness score of a surface of an object. The system and methods described in the present embodiments achieve industrial standard results relative to situations where a person is manually reviewing a surface with their eyes, and the methods can be easily applied into other scenarios. Moreover, the cost of the methods and systems of the present embodiments is relatively low compared to related systems with expensive optical components.

Figure 1:
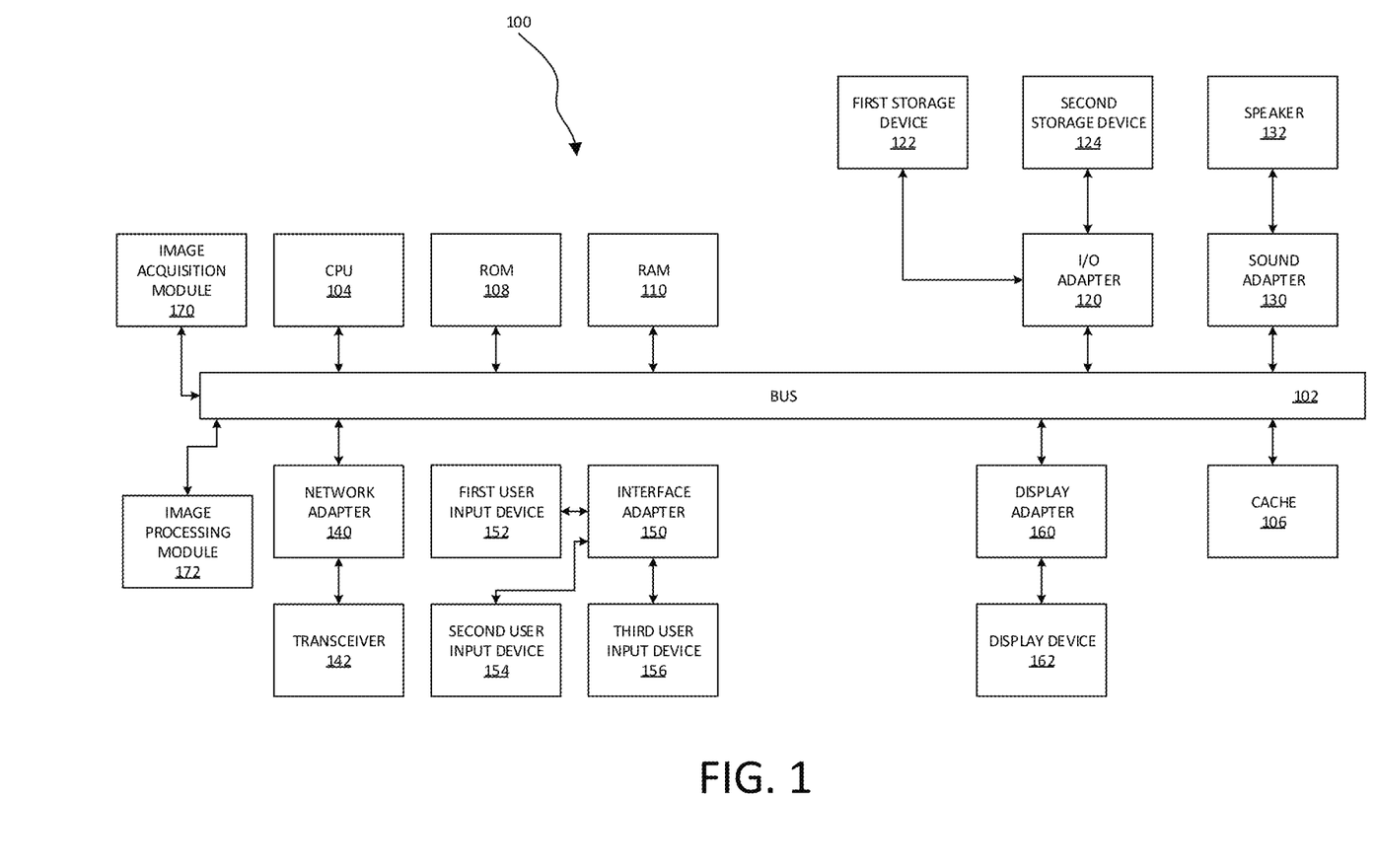
FIG. 1 depicts a block diagram of a processing system, according to embodiments.

Referring now to the drawings in which like numerals represent the same or similar elements and initially to FIG. 1, an exemplary processing system 100 to which the present embodiments may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 may be any of a disk storage device (e.g., a magnetic or optical disk storage device), a solid-state magnetic device, and so forth. The storage devices 122 and 124 may be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 may be any of a keyboard, a mouse, a keypad, an image capture device, a motion sensing device, a microphone, a device incorporating the functionality of at least two of the preceding devices, or any other suitable types of input devices. The user input devices 152, 154, and 156 may be the same type of user input device or different types of user input devices. The user input devices 152, 154, and 156 are used to input and output information to and from system 100.

In an embodiment, an image acquisition module 170 is coupled to the system bus 102. The image acquisition module 170 may include an image capture device such as a charge coupled device ("CCD") camera, or other suitable digital image sensor that converts light into electrical charges. In an embodiment, the processing system 100 also includes an image processing module 172. The image processing module 172 includes one or more software or hardware components capable of executing image processing on the captured images.

The processing system 100 may also include other elements (not shown), as readily contemplated by one of skill in the art, as well as omit certain elements. For example, various other input devices and/or output devices may be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present disclosure provided herein.

Figure 2:
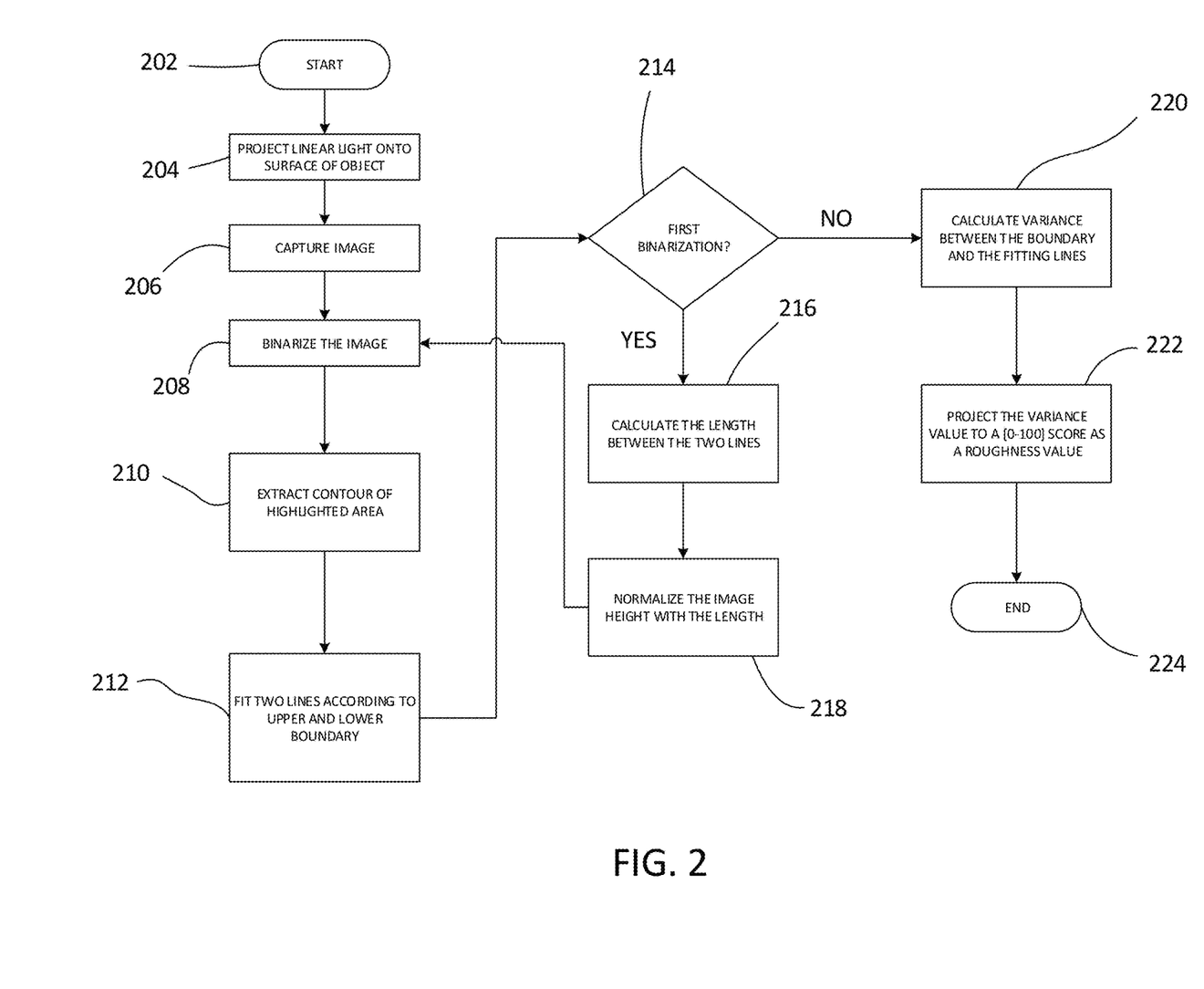
FIG. 2 is a flow chart of a process of determining a surface roughness of an object, according to embodiments.

Referring now to FIG. 2, the figure shows a flow diagram for a method of determining a smoothness value of a surface of an object. As shown in FIG. 2, the process starts in step 202. In step 204, the system projects linear light from a linear light source onto the surface of the object. It should be appreciated that light sources other than a linear light source may be used, provided that the system is able to extract a boundary line of the reflected light through digital image processing.

The system also includes an image capturing device (e.g., a charge coupled device, image sensor, digital camera, etc.), and in step 206 of the process, the image capturing device captures a digital image of the object. This image includes portions of the object where light is not reflected, and portions of the object where light is reflected. The portions of the object where the light is reflected appear brighter than the other portions of the object, and the portions of the object where the light is not reflected (i.e., non-reflected light portions) appear darker.

In step 208 of the process, the system performs digital image processing on the captured image, and binarizes the image into black and white portions. In general, a binary image is a digital image that has only two possible values for each pixel. Typically, the two colors used for a binary image are black and white. The color used for the object(s) in the image is the foreground color while the rest of the image is the background color.

In step 210 the binarized image is further processed to extract the contour of the boundary portion between the black portion of the image (i.e., where light is not reflected back to the camera) and the white portion of the image (i.e., the area where light is reflected upon the surface of the object back to the camera). The determination of the boundary portion can be made with edge detection algorithms, or any other suitable algorithm that identifies the change between black and white. In general, edge detection refers to any of a variety of mathematical methods that aim at identifying points in a digital image at which the image brightness changes sharply or has specific discontinuities. The points at which image brightness changes sharply are typically organized into a set of curved line segments termed edges. An object with a perfectly smooth surface (i.e., zero surface roughness) may either be perfectly flat or have an overall curvature. In other words, an object that has an overall curvature (e.g., a body panel of an automobile) may also have a perfectly smooth surface. In general, surface roughness is a component of surface texture, and is quantified by the deviations in the direction of the normal vector of a real surface from its ideal form. In the present embodiments, if the object has some amount of surface roughness, the edges (i.e., the set of curved line segments where the image brightness changes sharply) will not be completely straight and will have some variability. That is, if the surface is not completely flat (e.g., it has dimples or some other surface flaw), the surface will reflect light in different directions. In this regard, if the edge of the zone of reflected light coincides with one of these surface roughness irregularities, such irregularities will cause the boundary line between the zone of reflected light and the remainder of the surface to deviate from a perfectly straight line.

In step 212 of the process, the system takes these edge contour lines of the highlighted areas and generates two straight lines according to upper and lower boundary portions. The edge detection process in step 210 enables the system to generate a first line that represents the top edge of the reflection, and a second line that represents the bottom edge of the reflection. Thus, there are two straight lines. In an embodiment, the system utilizes linear regression models to create these straight lines from the jagged boundaries between the binarized portions of the image.

In step 214, the system determines whether or not this is the first iteration of binarizing the image. If this is the first binarization, there is another step of determining a normalized height of the reflected portion of the object. In an embodiment, the system alters the scale of the image (stretches or compresses the overall height or width of the image) such that the average height of the reflected portion of the image (i.e., the distance between the upper and lower boundary lines) is the same regardless of whether the object is perfectly flat or has an amount of surface curvature. Therefore, if the system determines that this is the first binarization of the image, the process continues to step 216.

In step 216, the system calculates an average distance between the first curved line that represents the top edge of the reflection, and the second curved line that represents the bottom edge of the reflection. These are the lines that were generated in step 212 according to the edge detection algorithm for the upper and lower boundary portions of the binarized image. Based on the type of object being imaged, the object may be very flat (e.g., a roof of a car), or it may have a significant curvature (e.g., a rounded body panel of a car). In the case of a convex surface, the surface will concentrate the reflected light, and therefore the reflected light zone will have a relatively narrower height. In the case of a convex surface (and with the same light source), the surface will scatter the light, and therefore the reflected light zone will have a greater height relative to the concave surface. If the object is flat (i.e., having no significant concave or convex surface portions), the reflected light zone will have a height somewhere between that of the convex and concave surfaces. Therefore, depending on the flatness of the object, the rectangular zone of reflected light will have varying heights and widths. If these varying heights of the zone of reflected light are not considered, and assuming that the entire object has a uniform surface smoothness, the system could calculate a different smoothness score for an object depending on the nature of surface contour (i.e., flat, convex, concave, or some combination thereof). In particular, with a zone of reflected light having a smaller height, the average deviations from a fitted straight line would be less (i.e., the micro-deviations on the boundary curve would appear to be smaller). This would give the impression that the object is smoother than it actually is. On the contrary, with a zone of reflected light having a larger height, the average deviations from a fitted straight line would be greater (i.e., the micro-deviations on the boundary curve would appear to be larger). This would give the impression that the object is rougher than it actually is. This would have the disadvantage of erroneously calculating different smoothness scores for the same hypothetical object (i.e., the object having a uniform smoothness) depending on where the measurements were being taken. However, the present embodiments correct for this error by normalizing the height/width of the zone of reflected light using image processing techniques. Although the present example discussed the curvature of the object as an influencing factor in the shape of the reflected light zone, other factors can also affect the shape (e.g., the distance and/or relative angle between the image capture device and the surface of the object, and the distance and/or relative angle between a projection angle of the light source and the surface of the object). For example, if the projection angle of the light source is held constant, changing an orientation direction (i.e., orientation angle) of the object would change how the light is reflected off the surface of the object, and thus change the shape of the reflected light portion. In another example, if the projection angle of the light source and the orientation angle of the object are held constant, changing a distance between the light source and object would affect the size of the reflected light portion.

In step 218, the system normalizes the heights of the reflected portion of light to consider whether or not the product is flat or has a significant surface curvature. For example, if the linear light source is projected onto a flat surface of an object from a direction perpendicular to this surface, the shape of the reflected portion of the light should be a substantially rectangular shape. However, if the surface of the object is curved, and/or if the direction of the linear light source is not perpendicular to the surface of the object (i.e., which would be inherent for some surface portions of any curved object), the shape of the reflected portion of the light would not be perfectly rectangular. It may be skewed, pinched, curved or otherwise distorted from a perfectly rectangular shape. In certain embodiments, the normalization of the of the heights of the reflected portions of light can be accomplished by resizing the digital image, and/or by skewing all or portions of the image in a particular direction or directions. Thus, after step 218 is completed, all of the reflected light zones in the different images have a substantially equal average height (i.e., a standard or predetermined average distance between the first and second boundary lines), regardless of whether the object is flat or curved. As a result, the size of the micro-deviations on the boundary curve of reflected light zone have also been normalized, and the smoothness calculations described herein can become more accurate and consistent.

After the normalization process has been completed in step 218, the process returns to step 208, where the resized image is once again binarized. The system repeats step 208, step 210, step 212, and then repeats the inquiry in step 214. In step 214, the system determines that this is no longer the first binarization operation. Therefore, the system is able to determine that the normalization process in step 218 is has already been completed.

The process continues to step 220, where the system calculates, for each of the curved upper and lower boundary lines between the binarized portions of the image, a variance value between these boundary lines and the straight lines generated in step 212 through the linear regression model. If the surface is very smooth, each point on the curved boundary line will have less of a variance from the linear regression generated straight line, and the overall variance for the entire boundary line will be less. In contrast, if the surface is very rough, each point on the curved boundary line will have a greater variance from the linear regression generated straight line, and the overall variance for the entire boundary line will be greater.

In step 222 the system processes the variance value and assigns a roughness value score. In an embodiment, the roughness value ranges from 0 to 100. If the surface is completely smooth, the roughness values for this object will be 100. In contrast, if the roughness value score is 0, then the surface of the object is extremely rough. In one embodiment, the roughness value score is determined by the following Equation 1, where "s'" is the roughness value score, "a" is a constant to control the variation of the curve, "s" is the standard deviation between the edge points of the boundary line and the straight line generated through linear regression, and the value of "a" is greater than zero.

$$s' = \frac{200}{1+e^{as}} \qquad \text{Equation 1}$$

Thus, when s=0 (i.e., the standard deviation is zero and the surface is absolutely smooth), the roughness value score s'=100. When the standard deviation s is larger (and the surface is rougher), s' becomes closer to zero. In step 224 the process ends.

Figure 3:
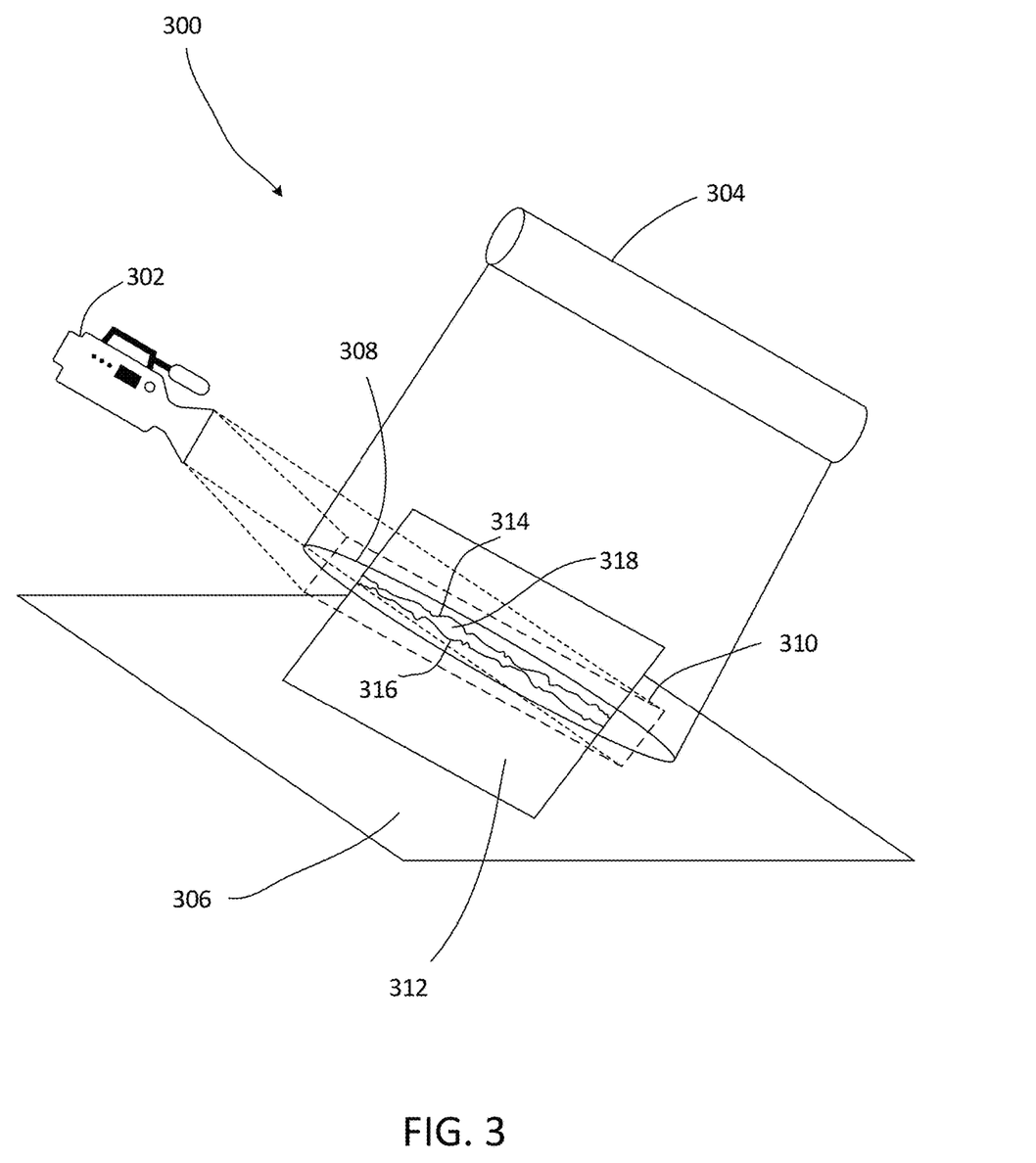
FIG. 3 is a perspective view of a system for determining surface roughness, in accordance with an embodiment.

Referring now to FIG. 3, in certain embodiments, a surface smoothness measurement system 300 is shown. In an embodiment, the system 300 includes a linear light source 304. This linear light source 304 projects a roughly rectangular beam of light 308 onto the surface of an object 312. The object 312 may be placed in a work area 306, or the object may be placed in any other suitable environment. This system 300 also includes an image capture device 302. As shown in the example of FIG. 3, the image capture device 302 is a video camera. However, it should be appreciated that the image capture device 302 can be a digital camera, or any other suitable device that is able to acquire digital images of an object.

As shown in FIG. 3, the linear light source 304 projects of zone of light 308 that is substantially rectangular (or an elongated elliptical zone of light). In general, the zone of light 308 encompasses the surface area of the object that is desired for a surface roughness measurement. As also shown in FIG. 3, the field of view 310 for the image capture device 302 is shown as a rectangular region superimposed around the area covered by the beam of light 308. In one embodiment, the field of view 310 of the image capture device 302 covers an entire width of the object 312. However, it is not necessary that either the zone of light 308 or the field of view 310 cover the entire width of the object, and they may cover a smaller portion thereof.

As also shown in FIG. 3, there is a zone of reflected light 318 that is reflected from the surface of the object 312, and this zone of reflected light 318 is in an area overlapping with the field of view of the image capture device 302. Thus, the image capture device 302 is able to capture the reflected light. In this zone of reflected light 318, there is an upper boundary line 314 and lower boundary line 316. The boundary lines are generally the areas where the image rapidly transitions from bright to dark. Although shown as lines 314 and 316 in FIG. 3 for the sake of simplicity, these are not the contour lines generated in step 210 or the straight lines generated through linear regression in step 212. Rather, these boundary lines 314 and 316 shown in FIG. 3 simply represent a general boundary between the lighter area (i.e., the area where the light is reflected) and the darker area (i.e., where light is not reflected).

Figure 4:
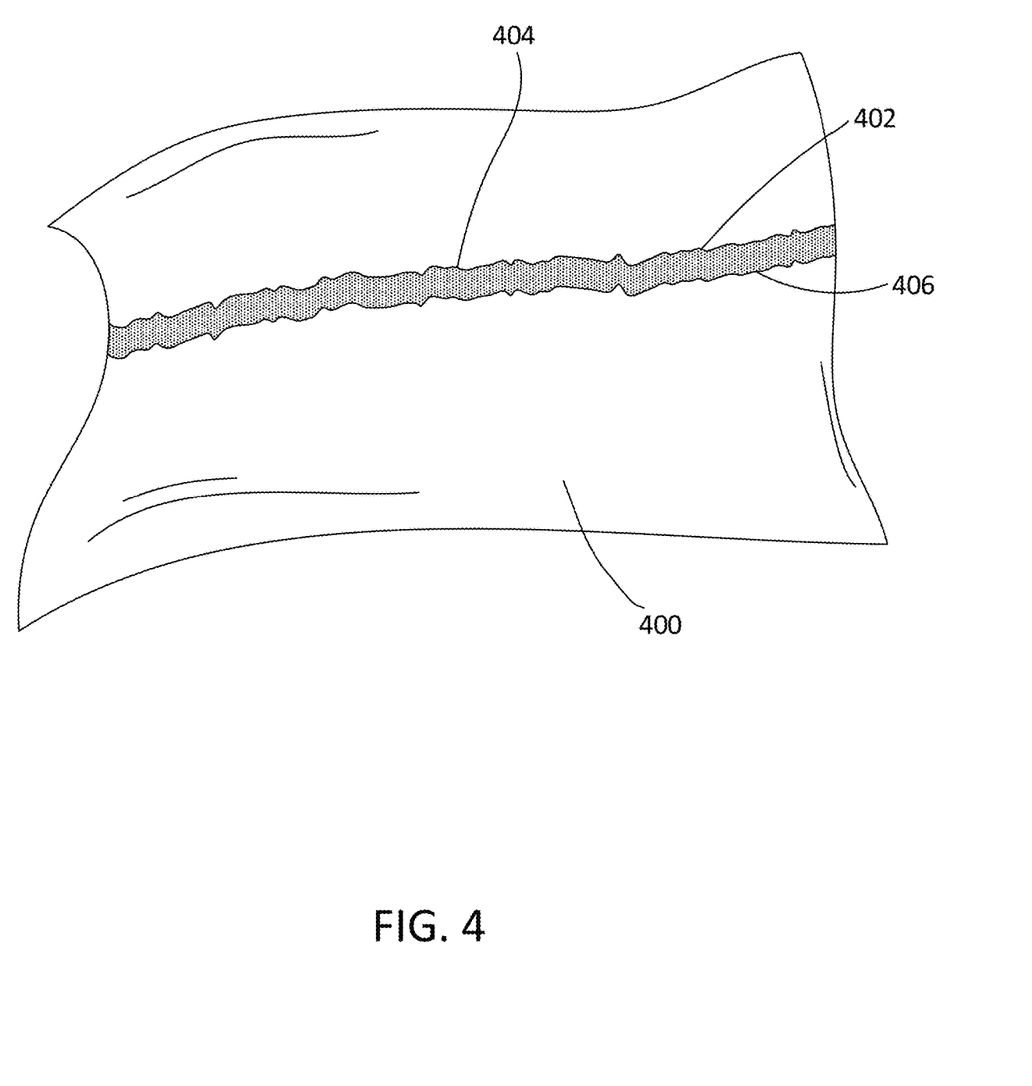
FIG. 4 is a perspective view of an object having a zone of reflected light, in accordance with an embodiment.

Referring now to FIG. 4, this is a photograph of light reflected off an object 400. The zone of reflected light 402 is shown as being brighter than the surrounding areas of the object 400. Also, boundary lines 404 and 406 represent the boundaries between the zone of reflected light 402 and the surrounding areas.

Figure 5A:
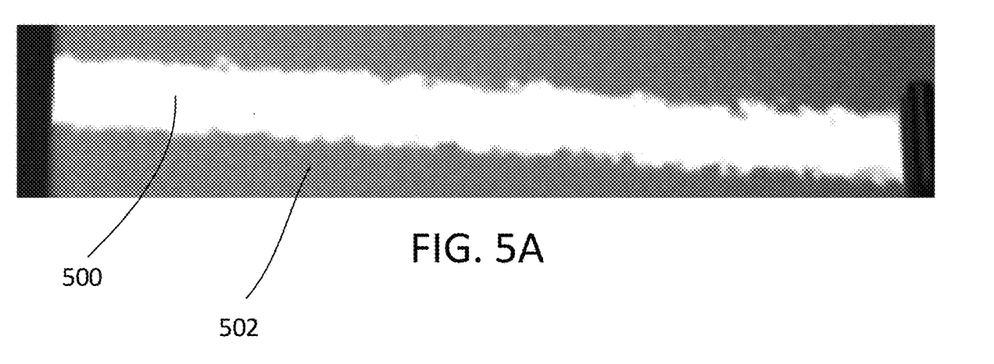
FIGS. 5A-5C are images of a linear light source reflected off a surface of an object, where the original image has been subjected to two image processing algorithms, in accordance with an embodiment.
Figure 5B:
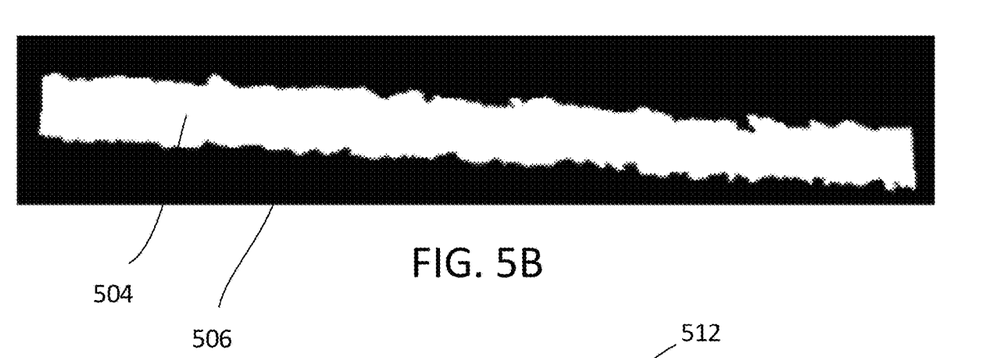
Figure 5C:
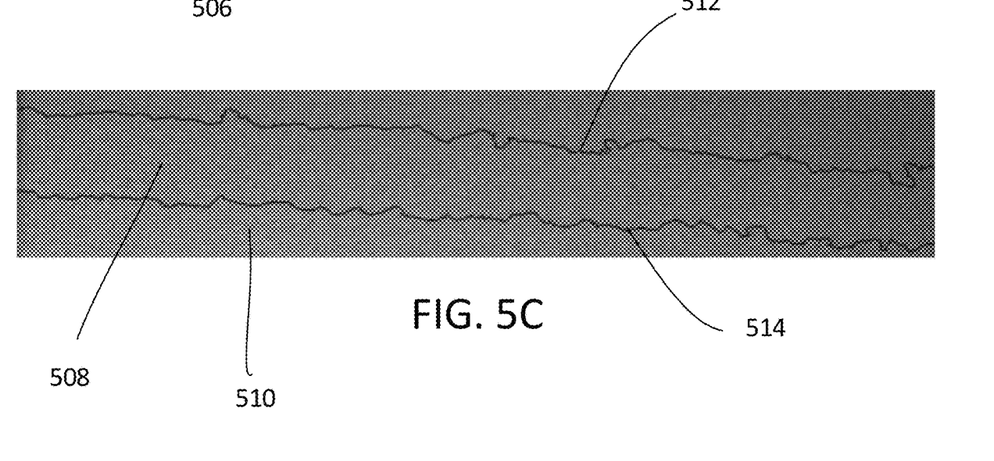

Referring now to FIGS. 5A, 5B and 5C, these three images show different stages of the image processing described above with respect to FIG. 2. FIG. 5A shows the raw captured image of the object in an area including and around the area of reflected light, similar to the image shown in FIG. 4. In FIG. 5A, the zone or area of reflected light 500 is lighter than the surrounding area where no light it reflected 502. The photograph showed in FIG. 5A corresponds to the captured image that is taken in step 206 of FIG. 2.

FIG. 5B shows a binarized version of the captured image from FIG. 5A, which is discussed in step 208 of FIG. 2. Thus, FIG. 5B is a binary image, having only black and white pixels. The white pixels represent the area of reflected light 504, and the black pixels represent the zone where no light (or a very small amount of light) is reflected 506.

FIG. 5C is the image of FIG. 5B that has been put through further image processing (e.g., edge detection) to identify the upper boundary line 512 and the lower boundary line 514. In one embodiment, the area of reflected light 508 and the area where no light is reflected 510 are no longer represented in a binary fashion. At this stage of image processing, the upper and lower boundary lines 512 and 514 are used for further smoothness analysis.

Figure 6:
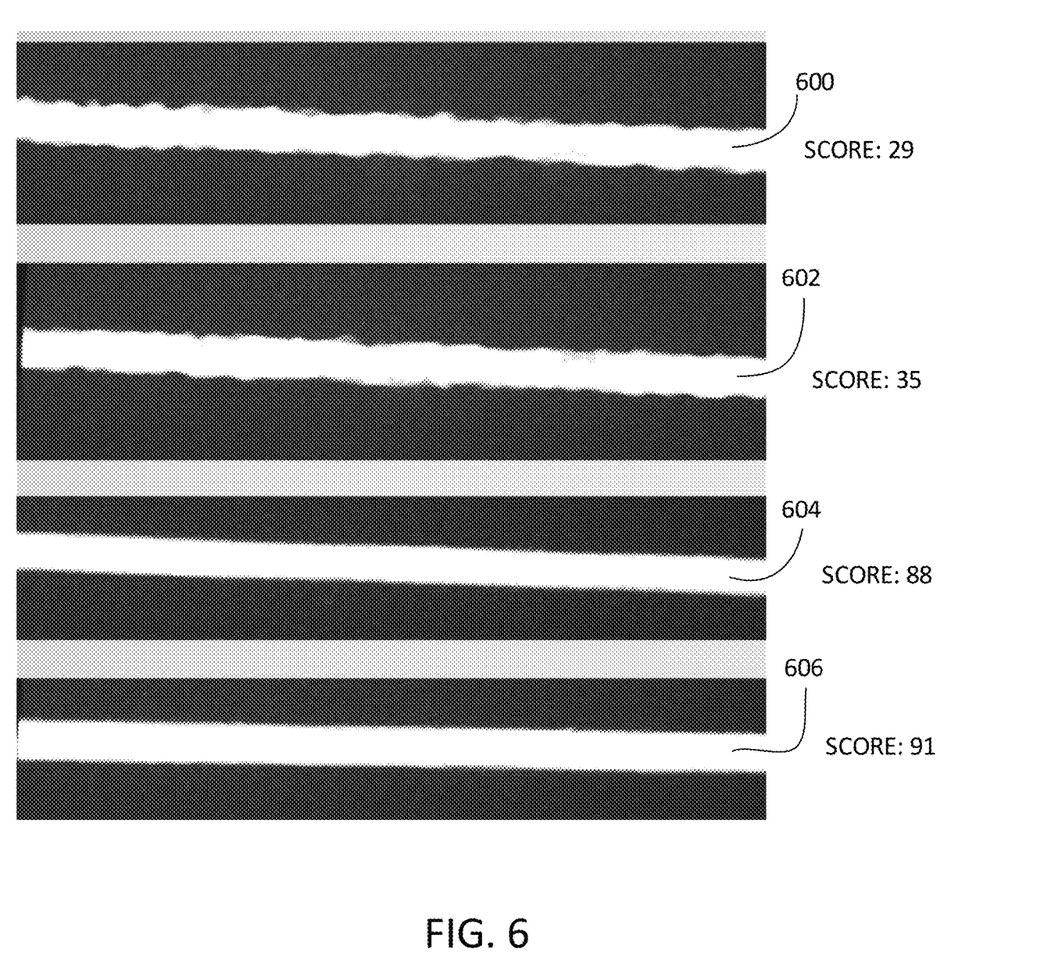
FIG. 6 is an image of a linear light surface being reflected off the surface of several objects, each object having a different level of surface roughness.

Referring now to FIG. 6, this figure shows a plurality of images of different objects (or different areas of the same object), where each object has a different respective smoothness value score. The first object 600 has a very rough boundary between the zone of reflected light and the area surrounding the zone of reflected light. Consequently, object 600 has a relatively low smoothness value score of 29 (i.e., the object has a relatively rough surface). Object 602 has a slightly less jagged boundary between the zone of reflected light and the surrounding area, and therefore the smoothness value score for this object 602 is slightly higher at 35. Object 604 has much less jagged boundary between the zone of reflected light and the surrounding area relative to both objects 600 and 602, and therefore the smoothness value score for this object 604 is much higher at 88 (i.e., it has a much smoother surface). Object 606 has the least jagged boundary between the zone of reflected light and the surrounding area relative to all of objects 600, 602 and 604, and therefore the smoothness value score for this object 606 is the highest at 91 (i.e., it has the smoothest surface of the four objects).

As described above, the present embodiments have the feature of being able to normalize the heights of an area of reflected light, such that all images have a standard height of this area without regard to the curvature of an object. In addition to different surface curvatures, the distance/angle between the linear light source and the camera, and the distance/angle between the image capture device and the object can cause the height of the area of reflected light to vary as well. Through the process of the initial binarization and normalization of the image, the present embodiments have the beneficial effect of being flexible with regard to a plurality of differently shaped objects. The present embodiments also have the beneficial effect of being flexible with regard to the placement of the camera, the object, and the image capture device relative to each other. Additionally, the present embodiments have the beneficial effect of being able to determine the smoothness of the surface of an object without the need for expensive optical systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of determining a smoothness of a surface of an object, the method comprising:
    processing an image of the object to obtain opposed first and second boundary lines of a first area of the image where light from a light source is reflected off the surface of the object;
    resizing the image to normalize an average distance between the first and second boundary lines;
    processing the resized image to obtain resized first and second boundary lines; and
    calculating a variance from linearity for at least one of the resized first and second boundary lines to determine a smoothness value of the surface of the object.

2. The method according to claim 1, wherein processing the image includes:
    binarizing the image to generate a reflected light portion of the image, and a non-reflected light portion of the image; and
    detecting edges between the reflected light portion of the image and the non-reflected light portion of the image to obtain the first and second boundary lines.

3. The method according to claim 1, further comprising using linear regression to generate first and second straight lines from the first and second boundary lines, respectively.

4. The method according to claim 3, wherein calculating the variance from linearity includes comparing the first and second straight lines with the first and second boundary lines, respectively.

5. The method according to claim 4, wherein calculating the variance from linearity is based on a standard deviation between edge points of the first and second boundary lines and the first and second straight lines, respectively.

6. The method according to claim 1, wherein resizing the image adjusts a size or a shape of at least portions of the first area.

7. The method according to claim 6, wherein the non-standard shape is any shape that deviates from an at least substantially rectangular shape, and the non-standard size is where the average distance between the first and second boundary lines deviates from a predetermined distance.

8. The method according to claim 1, wherein the smoothness value ranges from 0-100, with a value of 100 representing a perfectly smooth surface.

9. The method according to claim 1, further comprising:
    projecting the light from the light source onto the surface of the object; and
    capturing the image of the object with an image capture device.

10. The method according to claim 9, wherein the light source is a linear light source.

11. A device for determining a smoothness of a surface of an object, the device comprising:
    an image processing module that:
        processes an image of the object to obtain opposed first and second boundary lines of a first area of the image where light from a light source is reflected off the surface of the object;
        resizes the image to normalize an average distance between the first and second boundary lines; and
        processes the resized image to obtain resized first and second boundary lines; and a processor that calculates a variance from linearity for at least one of the resized first and second boundary lines to determine a smoothness value of the surface of the object.

12. The device according to claim 11, wherein the image processing module obtains the first and second boundary lines by:
   binarizing the image to generate a reflected light portion of the image, and a non-reflected light portion of the image; and
   detecting edges between the reflected light portion of the image and the non-reflected light portion of the image to obtain the first and second boundary lines.

13. The device according to claim 11, wherein the processor uses linear regression to generate first and second straight lines from the first and second boundary lines, respectively.

14. The device according to claim 13, wherein the processor calculates the variance from linearity by comparing the first and second straight lines with the first and second boundary lines, respectively.

15. The device according to claim 14, wherein the processor calculates the variance from linearity based on a standard deviation between edge points of the first and second boundary lines and the first and second straight lines, respectively.

16. The device according to claim 11, wherein the image processing module resizes the image by adjusting a size or a shape of at least portions of the first area.

17. The device according to claim 16, wherein the non-standard shape is any shape that deviates from an at least substantially rectangular shape, and the non-standard size is where the average distance between the first and second boundary lines deviates from a predetermined distance.

18. The device according to claim 11, wherein the smoothness value ranges from 0-100, with a value of 100 representing a perfectly smooth surface.

19. The device according to claim 11, further comprising:
   the light source that projects the light onto the surface of the object; and
   an image capture device that captures the image of the object.

20. The device according to claim 19, wherein the light source is a linear light source.

* * * * *